Dec. 18, 1962 J. J. CHANDLER ET AL 3,068,920
CONTINUOUS VARIABLE PRESSURE PRESS
Filed June 1, 1959 5 Sheets-Sheet 1

INVENTORS
Jun J. Chandler
BY Ray P. Chandler
Atty.

INVENTORS
Jun J. Chandler
BY Ray P. Chandler
Atty.

INVENTORS
Jun J. Chandler
Ray P. Chandler
BY
Atty.

Dec. 18, 1962     J. J. CHANDLER ET AL     3,068,920
CONTINUOUS VARIABLE PRESSURE PRESS
Filed June 1, 1959                     5 Sheets-Sheet 4
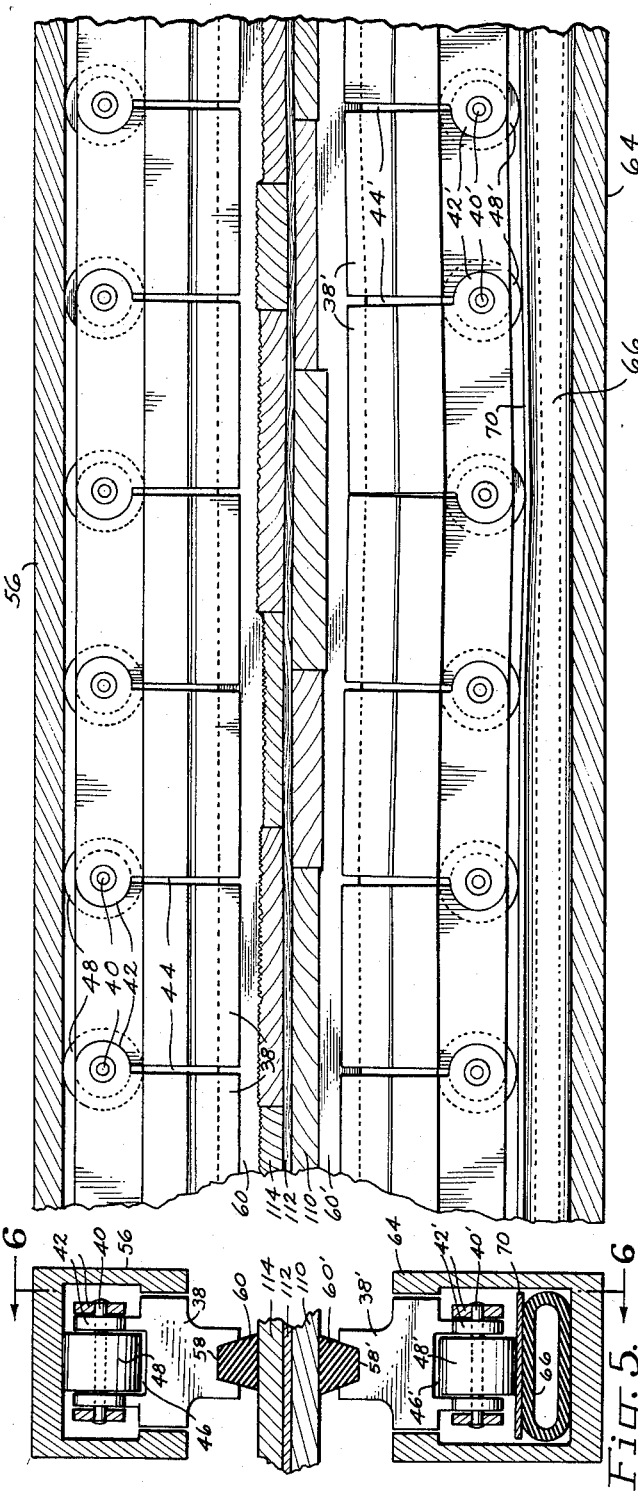
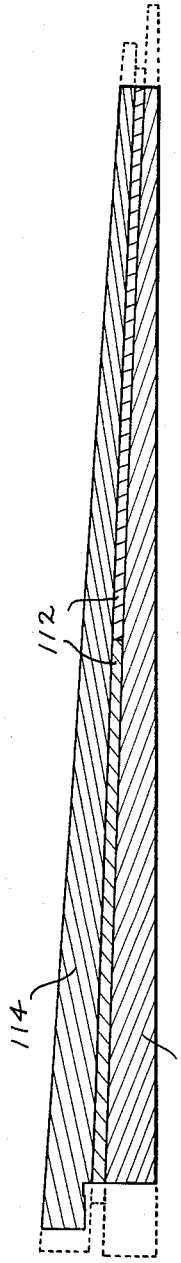
INVENTORS
Jun J. Chandler
BY Ray P. Chandler

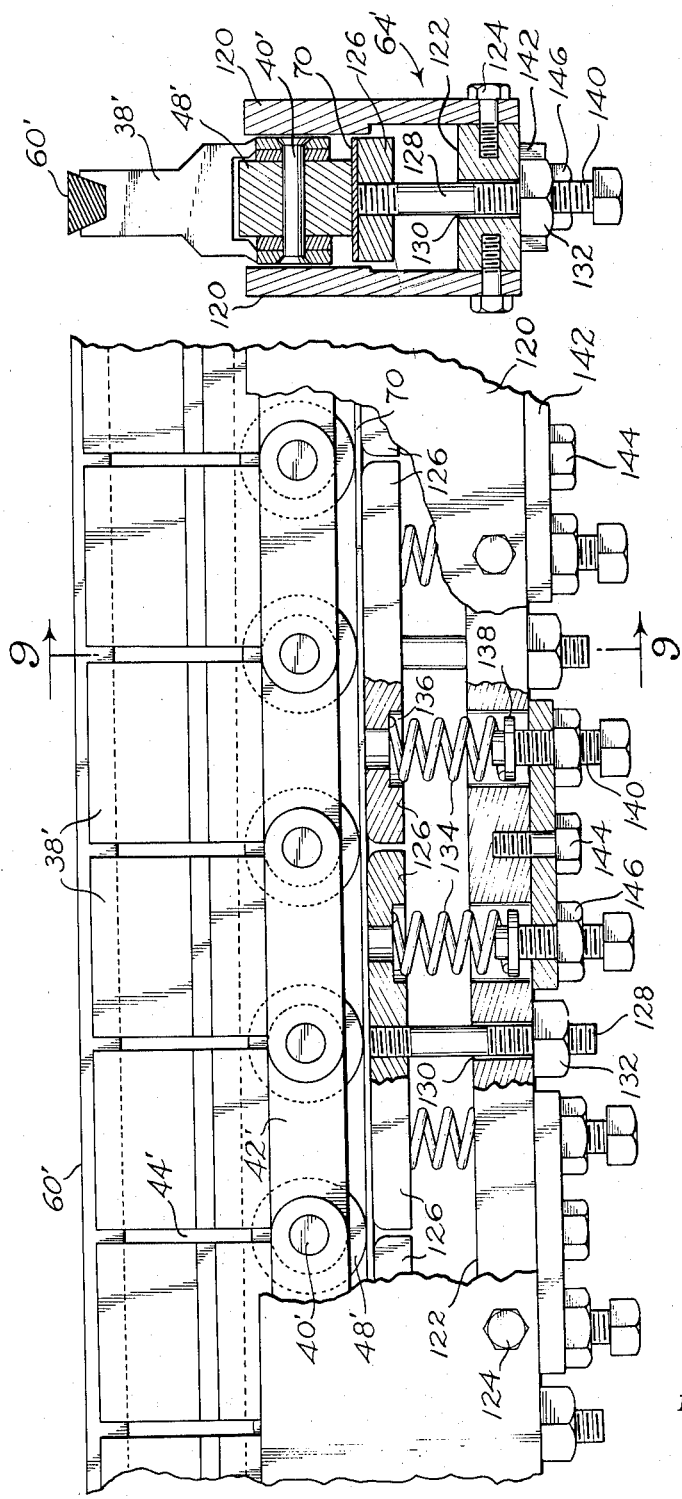

United States Patent Office 3,068,920
Patented Dec. 18, 1962

3,068,920
CONTINUOUS VARIABLE PRESSURE PRESS
Jun J. Chandler, deceased, late of Portland, Oreg., by Ruth L. Chandler, executor, 705 Terrace Drive, Oswego, Oreg., and Ray P. Chandler, 3016 NE. Siskiyou, Portland, Oreg.
Filed June 1, 1959, Ser. No. 817,223
9 Claims. (Cl. 144—281)

This invention pertains to presses, and relates particularly to a continuous variable pressure press adapted especially for the continuous production of laminated products. This is a continuation-in-part of our application Serial No. 559,275 filed January 16, 1956, now abandoned.

It is a principal object of the present invention to provide a continuous press which affords the application of uniform pressure over materials of varying thickness as the latter are moved through the press.

Another important object of the present invention is the provision of a continuous press of the class described in which the uniform pressure is adjustable over a substantial range.

A further important object of this invention is to provide a continuous press in which is incorporated a heating system which functions to set the bond for the laminated product, as the latter progresses through the press.

Still another important object of this invention is the provision of a continuous press including a heating system constructed to accommodate the passage therethrough of laminated products of varying thickness.

Still another important object of the present invention is the provision of a continuous press having incorporated therewith a high frequency heating system constructed to accommodate the passage therethrough of laminated products of varying thickness and providing the additional function of assisting the press in compressing the laminated product as the latter is drawn through the press.

A still further important object of this invention is the provision of a continuous press for the production of laminated products, which press is precise in operation, is capable of high capacity production, is adjustable with maximum facility and requires a minimum of maintenance and repair.

The foregoing and other objects and advantages of the present invention will appear from the following detailed description, taken in connection with the accompanying drawings, in which:

FIGURE 5 is a sectional view taken along the line 5—5 in FIGURE 3, showing further details of construction of the variable press elements of the apparatus;

FIGURE 6 is a fragmentary sectional view taken along the line 6—6 in FIGURE 5 and illustrating the operation of the variable press construction of the present invention;

FIGURE 7 is a view in side elevation of a laminated product produced by the apparatus of the present invention, the untrimmed product being indicated by the dotted line extensions and the finished product being shown in solid lines;

FIGURE 8 is a fragmentary view in side elevation of a modified form of the variable press component of the apparatus, a portion thereof being broken away to disclose details of construction; and FIGURE 9 is a sectional view taken along the line 9—9 in FIGURE 8.

Figure 1:
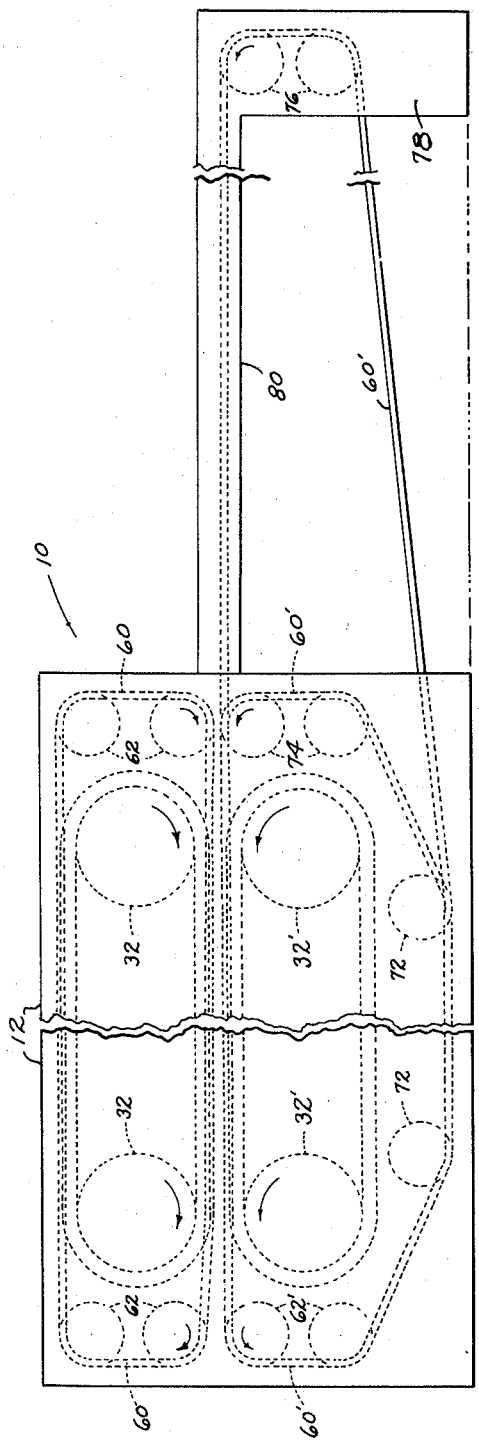
FIGURE 1 is a foreshortened view in side elevation of a continuous press embodying the features of the present invention.

Referring to the drawings, the apparatus includes a main frame 10, having laterally spaced vertical side panels 12 secured to horizontal top beams 14 and a base 16. The side panels are reinforced by longitudinally spaced vertical beams 18 which are secured between the top beams 14 and the base 16. Beams 18 also support a plurality of transverse beams 20 and 22 which are spaced vertically intermediate the ends of the beams 18. Horizontal reinforcing beams 24 and 26 are secured in vertically spaced relation to the inner sides of beams 18.

Adjacent the opposite ends of beams 24 there are secured the transversely aligned bearings 28 which rotatably support the shafts 30 therebetween. Each of these shafts carries a plurality of spaced sprockets 32, 34, 36, arranged in pairs.

Each pair of sprockets supports a continuous pressure chain which is composed of a plurality of links 38 pivotally interconnected by pins 40. Thus, the pressure chains are rendered longitudinally flexible. As best shown in FIGURES 5 and 6 of the drawings, adjacent links are provided with overlapping ears 42 having aligned openings therethrough for receiving the pins 40. It will be noted that a space 44 (FIGURE 6) is provided between adjacent links. The purpose of this space is described in detail hereinafter.

Each of the links is bifurcated in the area of the ears 42, providing a central space 46 for receiving a roller 48. The roller is mounted for rotation on the connecting pivot pin 40. The links are proportioned to space the rollers properly for registration with the circumferentially spaced notches 50 of the sprocket wheels.

Each of the upper stretches of the pressure chain, between the spaced supporting sprockets, is supported against sagging by means of an elongated guide channel member 52 which is supported by suitable horizontal beams 54. These guide members are generally U-shaped in cross section and are proportioned to receive the links 38 therein, with the rollers 48 bearing upon the lower closed end of the guide members. Similarly, the lower working stretch of each pressure chain is supported against upward deflection by means of an elongated guide channel member 56 which is supported by the transverse beams 20. The guide channel member has a general cross sectional shape of an inverted U, and is proportioned to receive therein the links 38 of the lower working stretch, with the rollers 48 bearing against the upper closed end of the guide member.

Each of the links 38 is provided on its outer edge with a longitudinal, inwardly tapered groove 58 proportioned to receive therein a continuous pressure belt 60. For purposes described more fully hereinafter, these belts are constructed of rubber or other material which provides a degree of flexibility and resilience through its cross-sectional dimensions. Each belt is reeved over idler pulleys 62 mounted adjacent the opposite ends of the main frame 10, outwardly from the associated sprockets, for rotation in the plane of said associated sprockets. Thus, the intermediate stretches of belt 60 are guided and supported by the links 38 which form the stretches of the upper pressure chain.

In a manner similar to the foregoing, a lower pressure chain assembly also is provided. The elements of this lower assembly are substantial duplicates of the upper assembly described hereinbefore. Accordingly, they are identified by the same reference numerals, but are distinguished from the previously described elements by use of the prime superscript. Thus, aligned bearings 28' are supported adjacent the opposite ends of the horizontal beams 26 and carry the shafts 30' upon which are mounted the spaced sprockets 32', 34', 36', each pair of which supports an endless pressure chain composed of a plurality of guide links 38' pivotally interconnected at the overlapping ears 42' by pivot pins 40'.

The upper working stretch of each of the lower pressure chains is supported against sagging by means of an elongated U-shaped guide channel member 64, supported upon the transverse beams 22. These guide channel members are proportioned to receive the guide links 38' therein, but are deeper than the associated guide members 56, for purposes now to be explained.

Supported upon the closed bottom end of each of the elongated channel members 64 is an elongated flexible tube 66 which is closed at one end and connected at the other end to conduit 68 which leads to a source (not shown) of compressed fluid, preferably air. Mounted freely upon the upper side of the flexible tube 66 is an elongated bearing plate 70. This plate preferably is an elongated strip of flexible steel which provides a durable support for the rollers 48' carried by the links 38' which form the upper working stretch of the pressure chain.

It will be understood that the pressure of the compressed fluid may be varied and controlled to provide for the pressurization of the flexible tubes 66 to any desired value, within a substantial range. In this manner, the amount of outward expansion of the tubes 66 may be controlled, thereby regulating the amount of upward force directed upon the links 38'.

An endless belt 60' is associated with each of the pressure chains carried by the pairs of sprockets 32', 34' and 36'. The upper working stretch of each of the endless belts 60' is received in and guided by the grooves 58' provided in the outer edge of the links 38'. The outfeed end of each belt is reeved over idler pulleys 62' mounted adjacent the outfeed end of the main frame 10 for rotation in the planes of the associated sprockets 32', 34', 36'. The lower stretch of each of the belts 60' is not retained in the grooves 58' in the lower stretch of chain links 38', however, but rather is reeved over spaced idler pulleys 72 supported by the vertical beams 18. The centrally positioned belt 60' associated with the central pair of sprockets 34', is reeved over idler pulleys 74 mounted adjacent the infeed end of the main frame 10 for rotation in the plane of the sprockets 34'.

The outer endless belts 60' associated with the pairs of sprockets 32' and 36' are substantially longer than the center belt associated with the pair of sprockets 34', and extend rearwardly a substantial distance from the infeed end of the main frame 10. At their rearward ends, these outer belts are reeved over idler pulleys 76 which are mounted for rotation between the vertical legs 78 which support the rearward ends of the laterally spaced guide plates 80. The forward ends of the guide plates are secured to the main frame 10. Thus, the combination of the spaced belts 60' and the guide plates 80 form an infeed assembly table.

Figure 3:
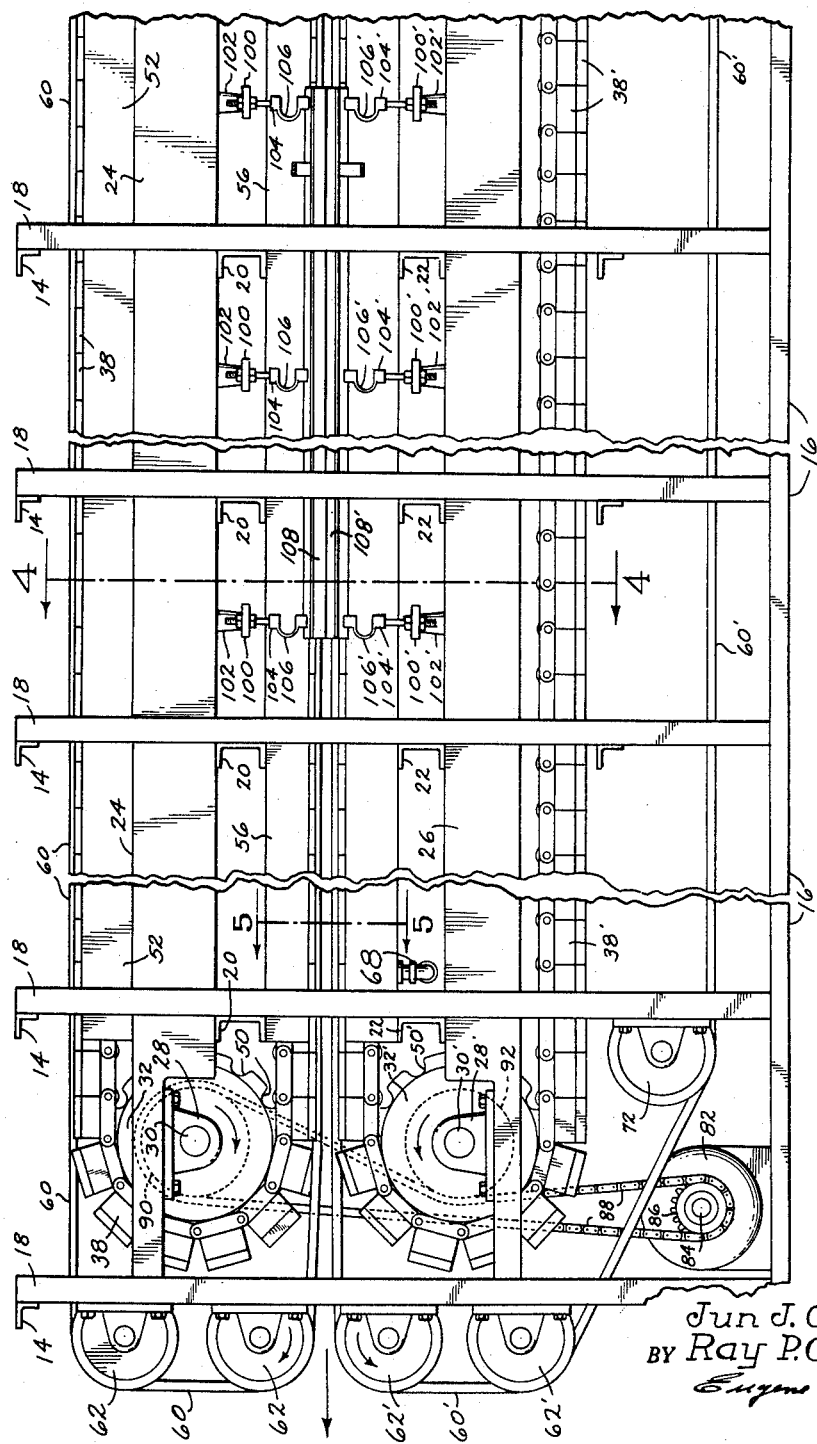
FIGURE 3 is a foreshortened fragmentary side view showing further details of construction of a portion of the press of the present invention.

The pressure chains and belts are driven from a single source of power. Referring to FIGURE 3 of the drawings, an electric motor 82 is mounted upon the base 16, and its drive shaft 84 carried a pulley 86, over which is reeved the endless drive belt 88. The drive belt also is reeved over pulley 90 secured to the shaft 30. A pulley 92 also is secured to shaft 30', and is engaged by one section of the drive belt 88. The arrangement of pulleys 90 and 92 and the engaging drive belt 88 is such as to cause synchronous but oppositely directed rotation of the shafts 30, 30', in the direction for moving the adjacent working stretches of the belts 60, 60' in the outfeed direction of the apparatus, as indicated by the arrows at the left end of FIGURE 3.

Also incorporated in the press apparatus of the present invention is means for heating the materials being subjected to the pressing operation. In the embodiment illustrated, the heating system is designed to provide high frequency induction heating. Thus, referring to FIGURES 3 and 4 of the drawing, there is provided a plurality of elongated upper bus bars 100 arranged in longitudinally spaced relation between the sides of the main frame 10. The bus bars are supported by means of electrically nonconducting supports 102 secured to transverse beams of the main frame.

Figure 4:
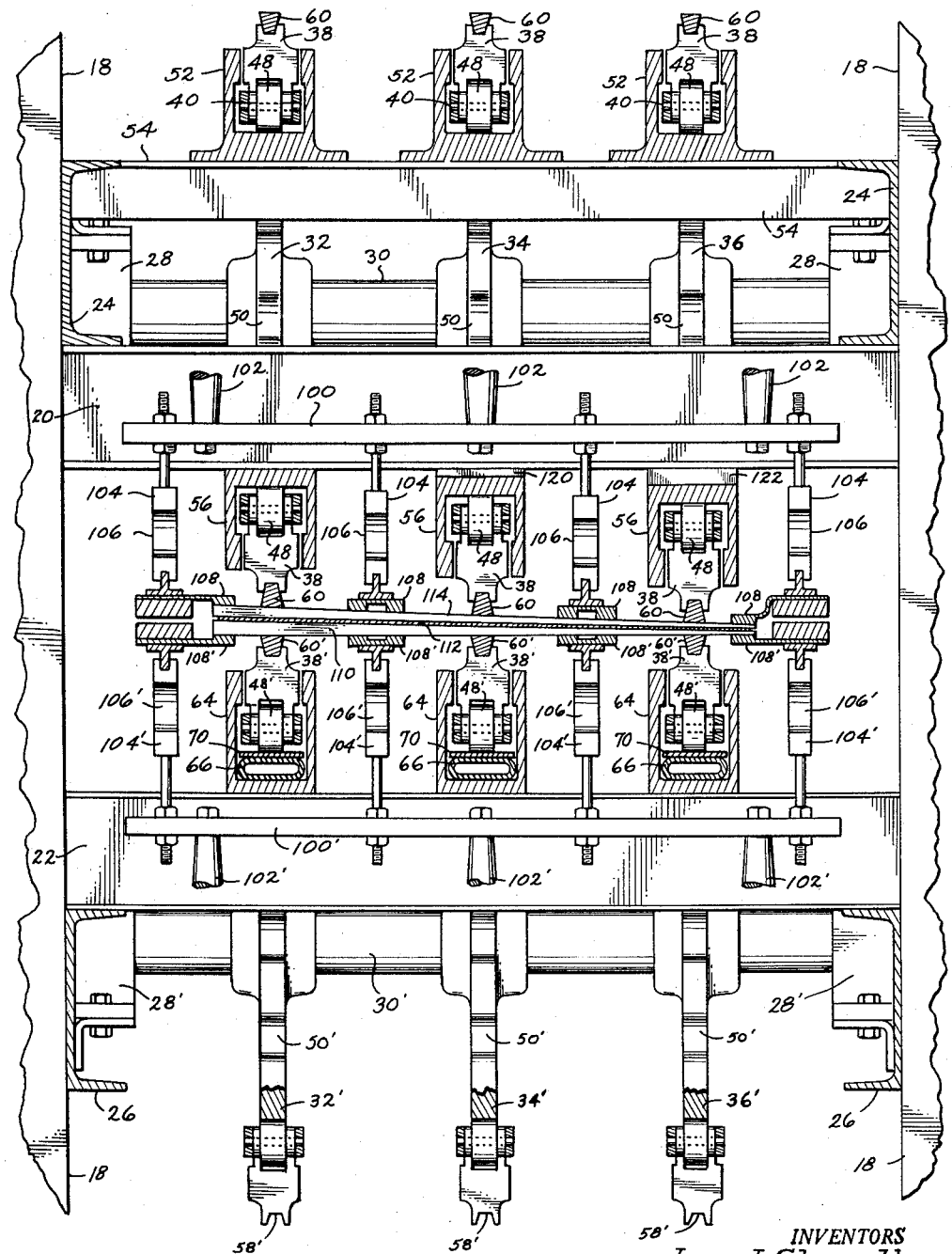
FIGURE 4 is a fragmentary sectional view taken along the line 4—4 in FIGURE 3 and showing further details of construction of the pressing and heating elements of the apparatus.

Secured to each bus bar 100 in longitudinally spaced relation are a plurality of resilient electrical conductors 104. They are arranged in laterally spaced rows which extend parallel to and are positioned on opposite sides of each of the guide members 56, as best shown in FIGURE 4. In the embodiment illustrated and best shown in FIGURE 3, each of the conductors 104 is provided intermediate its ends with a U-shaped resilient spring section 106, for purposes described more fully hereinafter. The lower ends of the conductors forming each row are secured to an elongated upper electrode 108 which extends parallel to the endless belt 60. Thus, in the embodiment best illustrated in FIGURE 4, there are provided four transversely spaced electrodes 108 disposed on opposite sides of the three belts 60.

The elements of the upper electrode assembly are duplicated for a lower assembly, and therefore the same reference numerals are applied, but distinguished by the prime superscript. Thus, a plurality of bus bars 100', supported by the main frame by electrically nonconducting connectors 102', are provided with a plurality of resilient conductors 104'. These conductors extend upwardly on opposite sides of the lower channel members 64, and are arranged in longitudinal rows. The conductors are connected at their upper ends to the laterally spaced elongated electrodes 108'.

By the foregoing arrangement, there is provided a plurality of opposing pairs of electrodes 108, 108' disposed on opposite sides of the endless belts 60, 60'. The elements of each pair of electrodes are urged resiliently toward each other by means of the resilient spring elements 106, 106'.

The bus bars 100 and 100' are connected to a source (not shown) of high frequency current, the latter being transmitted through the pairs of electrodes to the material to be heated, in manner well-known to those skilled in the art.

Referring now to FIGS. 8 and 9 of the drawings, there is shown a modified form of variable pressure means which may be substituted for the elongated fluid pressure tubing 66 and associated source of compressed fluid pressure. The elongated guide channel 64' is formed of laterally spaced apart side plates 120 interconnected by the bottom plate 122, as by means of the screws 124. The bearing plate 70 is supported upon a plurality of plate blocks 126 which are maintained in longitudinally spaced relation by the guide bolts 128, each of which is secured to a plate block and the threaded end thereof projects freely through an opening 130 in the channel bottom plate 122. An adjusting nut 132 is mounted on the threaded end of each guide bolt for adjusting the maximum displacement between the guide block 126 and the bottom plate 122.

Each plate block is urged resiliently to its position of maximum displacement from the channel bottom plate by means of a pair of springs 134 located one on each side of the associated guide bolt 128. Each spring is retained at one end in a pocket 136 provided in the plate block and at its opposite end on the shoulder 138 of a threaded stud 140 which is secured adjustably in a tapped opening in the anchor plate 142 secured to the bottom plate 122 as by means of the screw 144. A lock nut 146 is provided on the stud for securing the latter in position of adjustment.

Whereas in the embodiment first described, the amount of upward force directed upon the links 38' by the flexible tube 66 is controlled by the amount of fluid pressure within the tube, this force is controlled in the embodiment of FIGS. 8 and 9 by proper adjustment of the threaded studs 140 to vary the degree of compression of the springs 134. It is understood, of course, that adjustment of the guide bolts 128 also may be necessary to provide the desired spacing between the working stretches of the belts 60 and 60'.

Although the use of the pressurized flexible tube 66 affords completely satisfactory operation, the variable pressure system of FIGS. 8 and 9 afford a somewhat greater degree of adjustability of spacing between the working stretches of the belts 60, 60' and of the pressure exerted upon the material carried between these stretches. The spring system also is not subject to the deterioration and breakdown of the flexible tubing. Moreover, the spring system affords more positive holddown and its maintenance and repair are accommodated with greater facility and less cost.

The apparatus of the present invention is adapted with particular advantage to the production of laminated products whose thickness varies throughout their dimensions. Although it will be understood that the apparatus may be employed in the production of many forms of laminated products, of both uniform and non-uniform thickness, the operation of the apparatus is described hereinafter with particular reference to the production of a shake siding panel.

Figure 2:
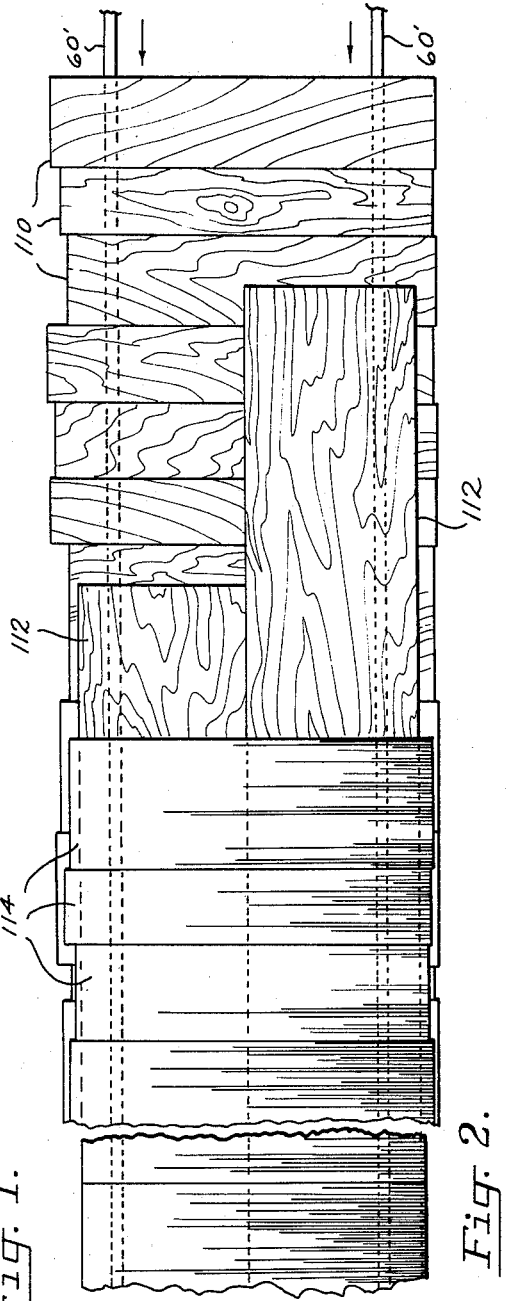
FIGURE 2 is a foreshortened fragmentary plan view showing progressive stages of product assembly, as afforded by operation of the apparatus of the present invention.

Referring particularly to FIGURES 1 and 2 of the drawings, the elements of the shake panel are assembled by hand upon the assembly conveyor table formed by the outer belts 60' and the guide plates 80. This assembly conveyor is of substantial length, for example 50 feet, and workers are stationed on opposite sides thereof in proper positions. First, there is arranged upon the belts 60' between the guide plates 80 a continuous row of low grade shingles 110, placed in edge-abutting relation. As this continuous row of shingles progress forwardly toward the infeed end of main frame 10, elongated panels 112 of wood veneer, preliminarily coated on both sides with a glue or adhesive of the type capable of being set with heat, then are deposited upon the row of shingles, with the grain of the wood panels disposed perpendicularly with respect to the grain of the shingles. The panels 112 also are arranged in edge-abutting relation, as shown in FIGURE 2. Finally, a continuous row of first grade shakes 114 are arranged upon the upper glued surface of the veneer panels 112, in edge-abutting relation, with the grain and taper of the shakes extending in the same direction as the grain and taper of the bottom row of shingles.

Referring now to FIGURE 4 of the drawings, the laminated assembly is shown to be thicker in cross section at one end than at the other, with a substantially uniform taper therebetween. The undercourse of shingles 110 is disposed horizontally upon the belts 60', and therefore the upper belts 60 are spaced upwardly therefrom at varying distances to accommodate the tapered cross-section of the panel assembly. This is achieved, in the embodiment illustrated, by securing the left hand guide channel 56, associated with sprockets 32, directly to the upper transverse beams 20, and interposing between said beams and the guide channels 56 associated with the sprockets 34 and 36 the spacer shims 120 and 122, respectively, of progressively increasing thickness, to accommodate the difference in thickness of the laminated assembly in the contact areas of the associated belts.

The assembled elements of the panel enter the infeed end of the press contained in the main frame 10, between the adjacent idler rollers 62 and 74, and then progress forwardly between the adjacent working stretches of the pressure chains formed by the links 38, 38'.

Referring now to FIGURE 6 of the drawings, it is to be noted that the shingles 110 forming the undercourse of the lamination are of diverse and random thicknesses, as are the shakes 114 forming the outer course. The resilient belts accommodate these variations by conforming to the contours of the contacting surfaces of the shingles and shakes, and yet maintain positive driving engagement therewith to insure against displacement of the assembly during passage through the press.

It is desirable that the continuous lamination be subjected to uniform pressure in order to achieve proper bonding. It is in this regard that the provision of the pressurized tubes 66 or springs 134 is of particular advantage. The tubes are pressurized or the springs compressed to the extent required to provide the desired compressive pressure on the lamination. Furthermore, in view of the fact that the tubes or springs and the overlying roller bearing strips 70 are flexible, the links 38' and the belts 60' carried thereby are permitted to be flexed in response to changes in thickness of adjacent shingles and shakes. The spacing 44' between adjacent links is sufficient to accommodate the degree of deflection required. When the tubes are used the overall pressure therein is not changed substantially, since inward deflection of the tubes in one area generally is accompanied by outward distention of the tubes in other areas associated with thinner cross sections of the lamination. As a result, the lamination is subjected to a uniform pressure as it passes through the apparatus.

During the pressing operation, the continuous strip of laminated material passes between the spaced pairs of electrodes 108, 108' (FIGURE 4), through which heat is applied to the lamination in the manner explained hereinbefore. As previously mentioned, these pairs of electrodes are mounted resiliently in such manner as to be urged toward each other. Thus, they are maintained in positive contact with the surfaces of the lamination, insuring maximum efficiency of heat transfer to the lamination. In addition, the pressure exerted by the electrodes assists the pressure chains in pressing the elements of the lamination together.

The elements comprising the lamination progress through the pressing and heating apparatus at a rate calculated to effect proper setting of the glue or adhesive. The bonded lamination then progresses from the apparatus, in the direction of the arrows in FIGURE 3, to a trimming apparatus. It will be noted in FIGURE 2 of the drawings that the lateral edges of the shingles 110, veneer 112 and shake 114 are not aligned as they emerge from the press. Accordingly, in order to provide the finished shake siding panel with uniform dimensions and proper contours, the thinner end of the bonded lamination is subjected to the action of a trimimng saw to remove the jagged edge indicated by the dotted lines at the right hand in FIGURE 7. Simultaneously, the thicker end of the panel is subjected to a combination cut-off saw and dado head, by which, respectively, the thickened end is trimmed to a uniform line and an undercut is made to provide the desired shadow line effect for the finished panel.

From the foregoing it is believed to be apparent that the apparatus of the present invention affords advantages of operation heretofore not available. Primary among these is the provision of uniform pressure over a continuously moving laminated assembly, regardless of variations in thickness thereof. This feature contributes greatly to the development of a consistent bond between the elements of the lamination, thereby producing a product of uniform strength. In addition, the provision of the pressurized flexible tubing or the adjustable springs affords effective means for regulating the amount of uniform pressure required to effect proper bonding of diverse materials and adhesives.

The apparatus is of simplified and rugged construction, accommodating continued use for long periods of time with a minimum of maintenance and repair.

Those skilled in the art will recognize that various changes and modifications of the structural details illustrated and described hereinbefore may be made without departing from the scope and spirit of the present invention. For example, various conventional means other than the high frequency induction heating system illustrated may be employed for heating the laminated assembly during the pressing cycle. As another example, the flexible tubes 66 may be pressurized by hydraulic fluid or other equivalents of compressed air. Still further, the belts 60, 60′ may be omitted for various types of operation, in which case the links 38, 38′ may be constructed of or capped with a resilient material.

The foregoing and other changes and modifications may be made, as will be apparent, and therefore it is to be understood that the foregoing description is primarily illustrative of the invention and is not to be construed as limiting the scope thereof.

Having now described our invention and the manner in which the same may be used, what we claim as new and desire to secure by Letters Patent is:

1. A continuous press comprising a frame, a plurality of laterally spaced pairs of transversely spaced conveyor means mounted on the frame, the conveyor means of each pair having longitudinally movable working stretches facing each other for engaging therebetween the material to be pressed, at least one of the working stretches of each pair being longitudinally flexible, a plurality of elongated unitary structural guide channel means mounted on the frame and each proportioned to receive and guide one of the flexible working stretches, and elongated longitudinally flexible resilient support means contained within each guide channel means and having a longitudinally flexible bearing surface engaging and supporting the associated flexible working stretch, the flexibility of the bearing surface being sufficient to provide for pressure engagement of materials of varying thickness presented simultaneously between the working stretches.

2. The press of claim 1 wherein the resilient support means comprises elongated fluid pressure tube means contained in each guide channel means and having a longitudinally flexible bearing surface engaging and supporting the associated flexible working stretch, and means supplying fluid under pressure to said tube means for expanding the latter and urging the associated working stretch toward the other working stretch of the pair.

3. The press of claim 1 wherein the resilient support means comprises a plurality of longitudinally spaced bearing block means supported adjustably in each guide channel means, and adjustable spring means in each guide channel means engaging the bearing block means and urging the associated working stretch toward the other working stretch of the pair.

4. The press of claim 1 including elongated heat supplying means mounted resiliently on the frame and arranged longitudinally in pairs substantially parallel to and coplanar with the pairs of working stretches for pressure contact with the sides of the material being pressed between said working stretches.

5. The press of claim 1 wherein the bearing surface comprises an elongated thin readily bendable strip of resilient metal interposed between the support means and working stretch.

6. A continuous press comprising a frame, spaced conveyor means mounted on the frame and having longitudinally movable working stretches facing each other for engaging therebetween the material to be pressed, at least one of said working stretches being longitudinally flexible, the conveyor means having flexible working stretch comprising a plurality of links pivotally interconnected on transverse axes and forming a continuous chain, resilient means projecting from the material-engaging surfaces of the links of said flexible working stretch, the resilient means being deformable in the direction of its projecting thickness for conforming to the surface contour of the engaged material, elongated unitary structural guide channel means mounted on the frame and proportioned to receive and guide the flexible working stretch, and elongated flexible resilient support means contained within the guide channel means and having a longitudinally flexible bearing surface engaging and supporting said flexible working stretch, the flexibility of the bearing surface being sufficient to provide for pressure engagement of materials of varying thickness presented simultaneously between the working stretches.

7. The press of claim 6 including roller means on the links extending from the side of the latter opposite the material-engaging surfaces thereof for support on the flexible bearing surface.

8. The press of claim 6 wherein the links have longitudinal guide grooves in their outer faces and wherein the resilient means comprises a continuous belt supported on the frame for rotary movement and positioned with its working stretch receivable in said guide grooves.

9. The press of claim 1 wherein each working stretch comprises a plurality of links pivotally interconnected on transverse axes and forming a continuous chain, roller means on the links for support on the associated flexible bearing surface, and resilient means projecting from the material-engaging surfaces of the links, the resilient material being deformable in the direction of its projecting thickness for conforming to the surface contour of the engaged material.

References Cited in the file of this patent

UNITED STATES PATENTS

| | | |
|---|---|---|
| 1,995,382 | Fenton | Mar. 26, 1935 |
| 2,027,657 | Van Roggen et al. | Jan. 14, 1936 |
| 2,071,999 | Dike | Feb. 23, 1937 |
| 2,142,932 | Beard | Jan. 3, 1939 |
| 2,398,353 | Bolling | Apr. 16, 1946 |
| 2,490,819 | Lambert et al. | Dec. 13, 1949 |
| 2,492,530 | Kriegsheim | Dec. 27, 1949 |
| 2,597,923 | Croston | May 27, 1952 |
| 2,598,190 | Offutt | May 27, 1952 |
| 2,657,160 | Croston | Oct. 27, 1953 |
| 2,736,425 | Fisk | Feb. 28, 1956 |